(12) United States Patent
Pruessel et al.

(10) Patent No.: US 10,577,847 B2
(45) Date of Patent: Mar. 3, 2020

(54) METHOD FOR OPERATING A CLOSING DEVICE, AND CLOSING DEVICE

(71) Applicant: Robert Bosch GmbH, Stuttgart (DE)

(72) Inventors: Holger Pruessel, Sinzheim (DE); Klaus Buechinger, Gaggenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/301,776

(22) PCT Filed: Apr. 24, 2017

(86) PCT No.: PCT/EP2017/059634
§ 371 (c)(1),
(2) Date: Nov. 15, 2018

(87) PCT Pub. No.: WO2017/198421
PCT Pub. Date: Nov. 23, 2017

(65) Prior Publication Data
US 2019/0153765 A1 May 23, 2019

(30) Foreign Application Priority Data

May 19, 2016 (DE) .................. 10 2016 208 596

(51) Int. Cl.
*E05F 15/689* (2015.01)
*E05F 15/695* (2015.01)
(Continued)

(52) U.S. Cl.
CPC ............ *E05F 15/41* (2015.01); *E05F 15/695* (2015.01); *B60J 1/17* (2013.01); *E05F 15/40* (2015.01);
(Continued)

(58) Field of Classification Search
USPC ....... 318/264–266, 272, 275, 277, 282, 286, 318/466–469, 626
See application file for complete search history.

(56) References Cited

U.S. PATENT DOCUMENTS 3,891,909 A * 6/1975 Newson ............... H02H 7/0851
318/469
4,633,153 A * 12/1986 Thornton .............. E05F 15/695
318/266
(Continued)

FOREIGN PATENT DOCUMENTS

DE 102009019015 11/2010
DE 102009028914 3/2011
GB 2053513 2/1981

OTHER PUBLICATIONS

International Search Report for Application No. PCT/EP2017/059634 dated Jul. 21, 2017 (English Translation, 3 pages).

*Primary Examiner* — Bentsu Ro
(74) *Attorney, Agent, or Firm* — Michael Best & Friedrich LLP

(57) ABSTRACT

The invention relates to a method for operating a closing device (1), wherein with the aid of an electric motor (4) controlled by a control unit (7), a closing element (2) can be moved against a stop edge in a closing direction, the method comprising the following steps: detecting a pinching force on an object or on a body part between the closing element and the stop edge by integrating a measurement variable, wherein the pinching force is represented by a corresponding integrator value; signalling that a maximum permissible pinching force has been reached as a function of the integrator value; temporarily storing the integrator value after the electric motor has been stopped (4); and, when a resumption of an operation of the electric motor (4) in the closing direction is requested, starting the integration of the (Continued)

measurement variable beginning with the temporarily stored integrator value as a starting value.

14 Claims, 3 Drawing Sheets

(51) Int. Cl.
 *E05F 15/41* (2015.01)
 *E05F 15/40* (2015.01)
 *B60J 1/17* (2006.01)
(52) U.S. Cl.
 CPC ....... *E05Y 2400/32* (2013.01); *E05Y 2400/33* (2013.01); *E05Y 2900/55* (2013.01)

(56) References Cited

U.S. PATENT DOCUMENTS

| | | | | |
|---|---|---|---|---|
| 5,220,634 | A | * 6/1993 | Yaguchi | H02H 7/0851 |
| | | | | 318/459 |
| 5,963,001 | A | * 10/1999 | Peter | H02H 7/0851 |
| | | | | 318/563 |
| 2002/0074528 | A1 | * 6/2002 | O'Connor | G01V 8/12 |
| | | | | 250/559.4 |
| 2009/0162038 | A1 | 6/2009 | Tategami et al. | |
| 2013/0276748 | A1 | * 10/2013 | Kromer | H02H 7/0851 |
| | | | | 123/319 |

* cited by examiner

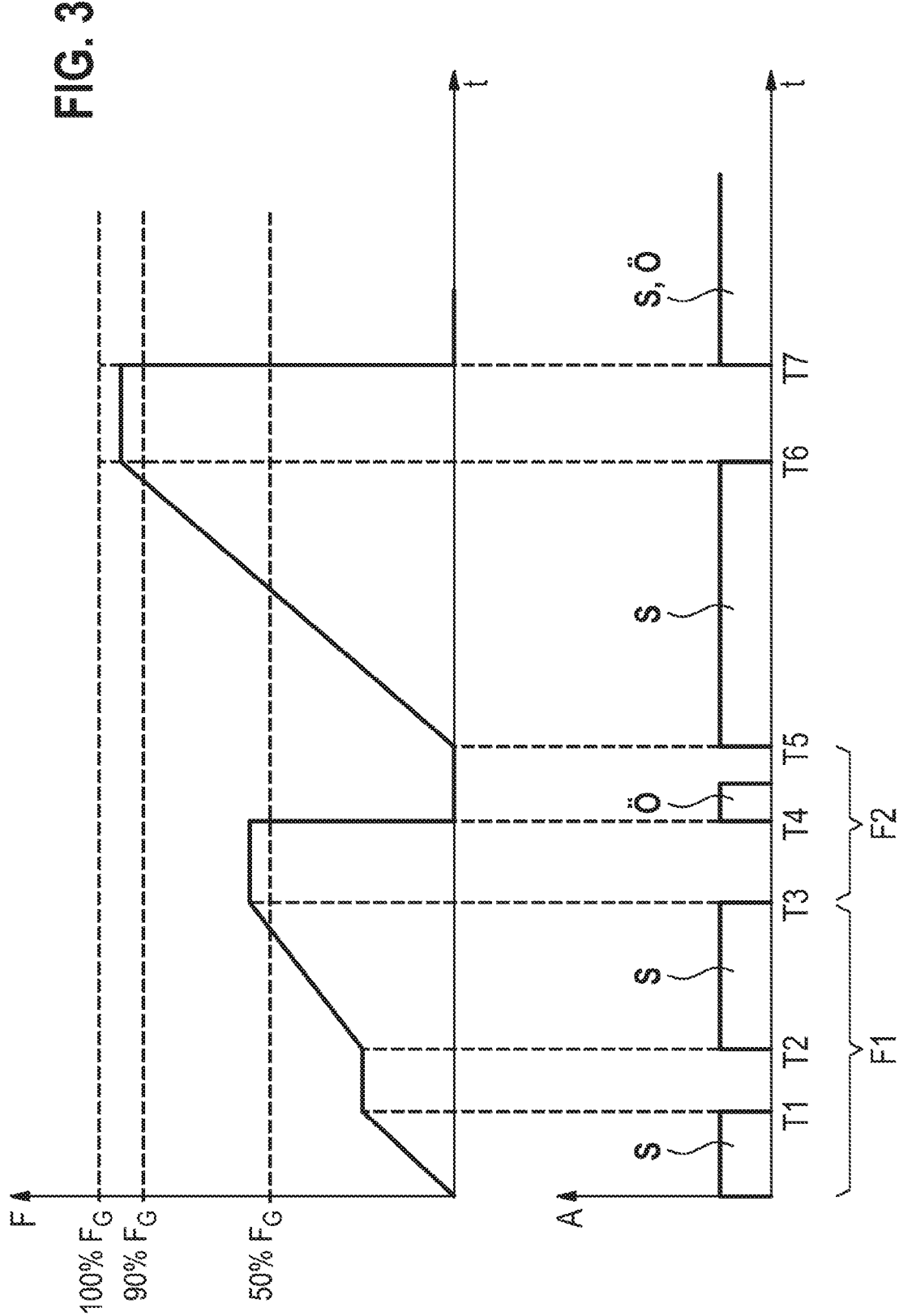

METHOD FOR OPERATING A CLOSING DEVICE, AND CLOSING DEVICE

BACKGROUND OF THE INVENTION

The present invention concerns automatic closing devices, such as for example automatic window lifters and roof closing systems in a motor vehicle that is fitted with a pinch protection function and that can be switched off and switched on again by automatic vehicle functions.

As a rule, automatic closing devices comprise a closing element (window pane, sliding roof) that is electrically driven by an electric motor. The electric motor is actuated by a control unit that is coupled to an operating element in order to actuate the electric motor depending on operation of the operating element and to specify the direction of motion of the electric motor.

In the case of closing devices on a motor vehicle, such as for example electric window lifters, electric sliding roofs and similar, it must be ensured that there are no objects or body parts that can be damaged or injured during a closing process, during which the closing element is moved toward a stop edge (window frame, roof opening). In order to avoid such a case, an algorithm is implemented in a control unit that detects a case of pinching during a closing process of the closing element. If a case of pinching is detected, the closing process is stopped, or reversing is carried out, during which the closing element at least briefly performs an opening movement.

The closing device is activated using the operating element as a rule, and an automatic operation can be activated depending on the type of operation of the operating element, during which the closing element is automatically moved in the opening direction or in the closing direction without the operating element having to remain operated. In an automatic operation mode the automatic operation can for example be activated when operating the operating element for a certain period of time.

In order to implement switching off of the electric motor on detecting pinching, as a rule a measurement variable is analyzed in order to obtain an indicator that is proportional to the pinching force. For example, in the case of electric closing devices a revolution rate gradient is often analyzed for this purpose, and pinching of a body part or an object between the stop edge and the closing element can be detected depending on a measurement variable determined from the profile of the revolution rate gradient. The magnitude of the measurement variable is available as an indication of a pinching force being present. If the measurement variable exceeds a specified pinching force threshold value in magnitude, then the electric motor is stopped and reversed in order to cause an opening movement of the window pane and to release any pinched body part or object.

It is the object of the present invention to provide a more reliable pinch protection function for a closing device, with which in particular exceeding a maximum pinching force can be avoided following the start of a closing process of a closing device.

SUMMARY OF THE INVENTION

This object is achieved by the method for operating a closing device according to the invention and by the closing device and the closing system as claimed in the independent claims.

Further embodiments are given in the dependent claims.

According to a first aspect, a method for operating a closing device is provided, wherein a closing element can be moved against a stop edge in a closing direction using an electric motor controlled by a control unit. The method comprises the following steps:

determining a pinching force on an object or a body part between the closing element and the stop edge by integrating a measurement variable, wherein the pinching force is represented by a corresponding integrator value;

signaling reaching a maximum permissible pinching force depending on the integrator value;

temporarily storing the integrator value after stopping the electric motor; and on demanding a resumption of an operation of the electric motor in the closing direction, starting the integration of the measurement variable beginning with the temporarily stored integrator value as the starting value.

Current closing devices for window lifters or sliding roofs comprise functionalities that provide for the closing process of the closing element to be stopped and then of course to be started again. With conventional implementations of the pinch protection function, this can result in the pinching force exceeding the maximum pinching force specified by the pinching force threshold value without reversing of the electric motor being triggered. A risk then occurs in particular if an increase in force is already detected when stopping the electric motor, but which has not resulted in triggering the pinch protection by the pinch protection function. If the closing process of the closing device is now resumed, the pinch protection function assumes that there is initially no pinching force.

One reason for this is that the current pinching force is only available indirectly, i.e. usually by the integration of a profile of the revolution rate gradient, because the provision of force sensors or similar is preferably avoided when implementing the closing device because of the increased costs. Because the pinching force is determined by the integration of the revolution rate gradient as a rule, the resulting measurement variable is a relative force value, so that when restarting the electric motor an already present increase in force is not taken into account and it is assumed that the pinching force at the start of the further closing process is 0. Therefore, the pinch protection function cannot respond in good time, which can result in a pinching force being increased to above the maximum pinching force in the event of pinching.

One idea of the above method consists of providing that an integrator value is stored on switching off an electric drive for the closing device in the case of closing devices with which a pinching force is determined by integration of a derived variable, such as for example a revolution rate gradient. In the event of a renewed start of the electric drive, the already present pinching force indicated by the integrator value can be taken into account. It can thus reliably be prevented that in the event of a further movement of the closing element in the closing direction, any pinched body part or object is not pinched with a pinching force that exceeds a maximum pinching force specified by a pinching force threshold value. This enables hazardous situations to be excluded, in which a body part or an object is already present on switching off the electric drive of the closing device before reaching the pinching force threshold value and in the event of restarting the electric drive in the closing direction, further pinching of the body part or the object can thus be carried out with an excessive pinching force.

Furthermore, after demanding a resumption of an operation of the electric motor in the closing direction, starting the electric motor in the closing direction can be prevented depending on the integrator value, in particular if the integrator value exceeds a specified first intermediate pinching force threshold value. In particular, after demanding the resumption of the operation of the electric motor, starting the electric motor in the opening direction can be permitted depending on the integrator value if the integrator value exceeds the first intermediate pinching force threshold value.

It can be provided that after demanding a resumption of an operation of the electric motor in the closing direction, starting the electric motor in the closing direction is prevented depending on the integrator value and reversing the electric motor in an opening direction opposite to the closing direction is carried out, in particular if the integrator value exceeds a specified second intermediate pinching force threshold value.

Furthermore, the measurement variable can be specified as or as a function of a revolution rate gradient of a revolution rate of the electric motor. The revolution rate gradient can be used as a measure of the pinching force that can only be determined based on a sensor detection of the revolution rate, so that a force sensor can be omitted.

Reaching the maximum permissible pinching force can be signaled if the magnitude of the integrator value exceeds a specified pinching force threshold value. As a result, the pinch protection is implemented in a reliable manner.

It can be provided that, when integrating the measurement variable a correction variable dependent on the integrator value is added before integrating, wherein the correction variable in particular comprises a specified magnitude and an inverse sign in relation to that of the instantaneous integrator value.

According to a further aspect, a closing device, in particular an automatic window lifter system, is provided comprising:
- a closing element, which can be moved against a stop edge in a closing direction using an electric motor,
- a control unit for operating the electric motor;
wherein the control unit is further embodied to:
- determine a pinching force on an object or a body part between the closing element and the stop edge by integrating a measurement variable, wherein the pinching force is represented by a corresponding integrator value;
- signal reaching a maximum permissible pinching force depending on the integrator value;
- temporarily store the integrator value after stopping the electric motor;
- when a resumption of an operation of the electric motor in the closing direction is demanded, start the integration of the measurement variable beginning with the temporarily stored integrator value as the starting value.

BRIEF DESCRIPTION OF THE DRAWINGS

Embodiments are described in detail below using the accompanying drawings. In the figures:

FIG. 3 shows a diagram for representing the time profiles of an activation of the electric motor and the profile of the determined pinching force.

DETAILED DESCRIPTION

Figure 1:
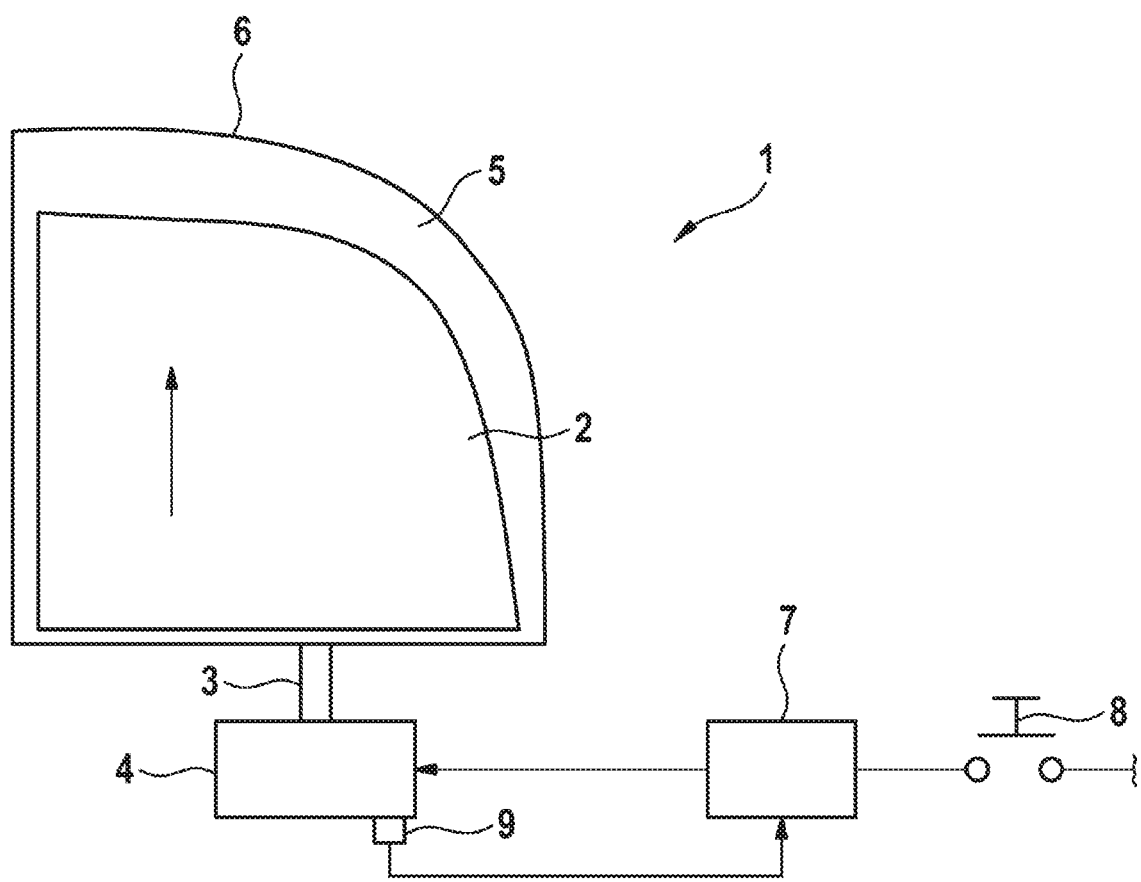
FIG. 1 shows a schematic representation of an automatic window lifter in a motor vehicle.

In FIG. 1, an automatic window lifter system 1 (closing device) for a side window of a motor vehicle is represented, with which a window pane 2 can be moved in a window frame 5 as a closing element using a closing mechanism 3. The window pane 2 is driven by an electric motor 4 by means of the closing mechanism 3, which can comprise a suitable gearbox. In the present exemplary embodiment, the window pane 2 is moved upward (in the direction of the arrow) in order to close the window, wherein the window pane 2 reaches a closure position on a stop edge 6 of the window frame 5.

The electric motor 4 is actuated by a control unit 7 depending on the operation of an operating element 8, so that the window pane 2 moves in a specified direction. For example, the window pane 2 can be moved upward to close the window by rotation of the electric motor 4, i.e. in a closing direction, on operating the operating element 8, so that the window pane 2 executes a closing process. Similarly, the window pane 2 can be moved downward to open the window by an opposite rotation of the electric motor 4, i.e. in an opening direction, on operating the operating element 8, so that the window pane 2 executes an opening movement.

Furthermore, it is possible, by operating the operating element 8 in a certain way, to activate an automatic running mode, in which even after releasing operation of the operating element 8, the previously specified movement of the window pane 2 is continued until either the operating element 8 is operated again, or until the window pane 2 has reached a stop position in a fully open position or a fully closed position.

Furthermore, the electric motor 4 or the closing mechanism 3 can be provided with a position sensor 9 that can detect a relative positional change of a movement of the window pane 2. In particular, the position sensor 9 can output pulses corresponding to the rotary motion during rotation of the electric motor 4, which can be used for incrementation or decrementation of a position counter that is implemented in the control unit 7. The respective counter value of the position counter is then a position indicator for a position of the window pane 2. Alternatively, instead of the position sensor 9 on the electric motor 4 or on the closing mechanism 3, a current profile of a motor current of the electric motor 4 can be analyzed in order to detect a relative position change of the electric motor 4 and thereby a relative position change of the position of the window pane 2, and by accumulating the position changes to provide a position indicator. By temporal analysis in a known manner, a revolution rate indication can be derived from the change against time of the position of the position counter. Accordingly, a revolution rate gradient against time can be derived from the revolution rate indicator, which can be used as an indication of a force counteracting the movement of the window pane 2.

In the control unit 7, a pinch protection function is implemented that detects a case of pinching using motor parameters. A case of pinching exists if an object or a body part gets between a window edge of the window pane 2 opposite the stop edge and the window frames 5 and a force is exerted on the object or the body part by a closing movement of the window pane 2.

As a rule, the pinch detection of the pinch protection function is carried out by integrating a negative revolution rate gradient if said gradient is less than a specified minimum gradient threshold value. If the integration value exceeds a specified pinching force threshold value representing a specified pinching force, then a switch-off of the electric motor 4 and a reversal of the movement of the window pane 2 in the opening direction take place.

Figure 2:
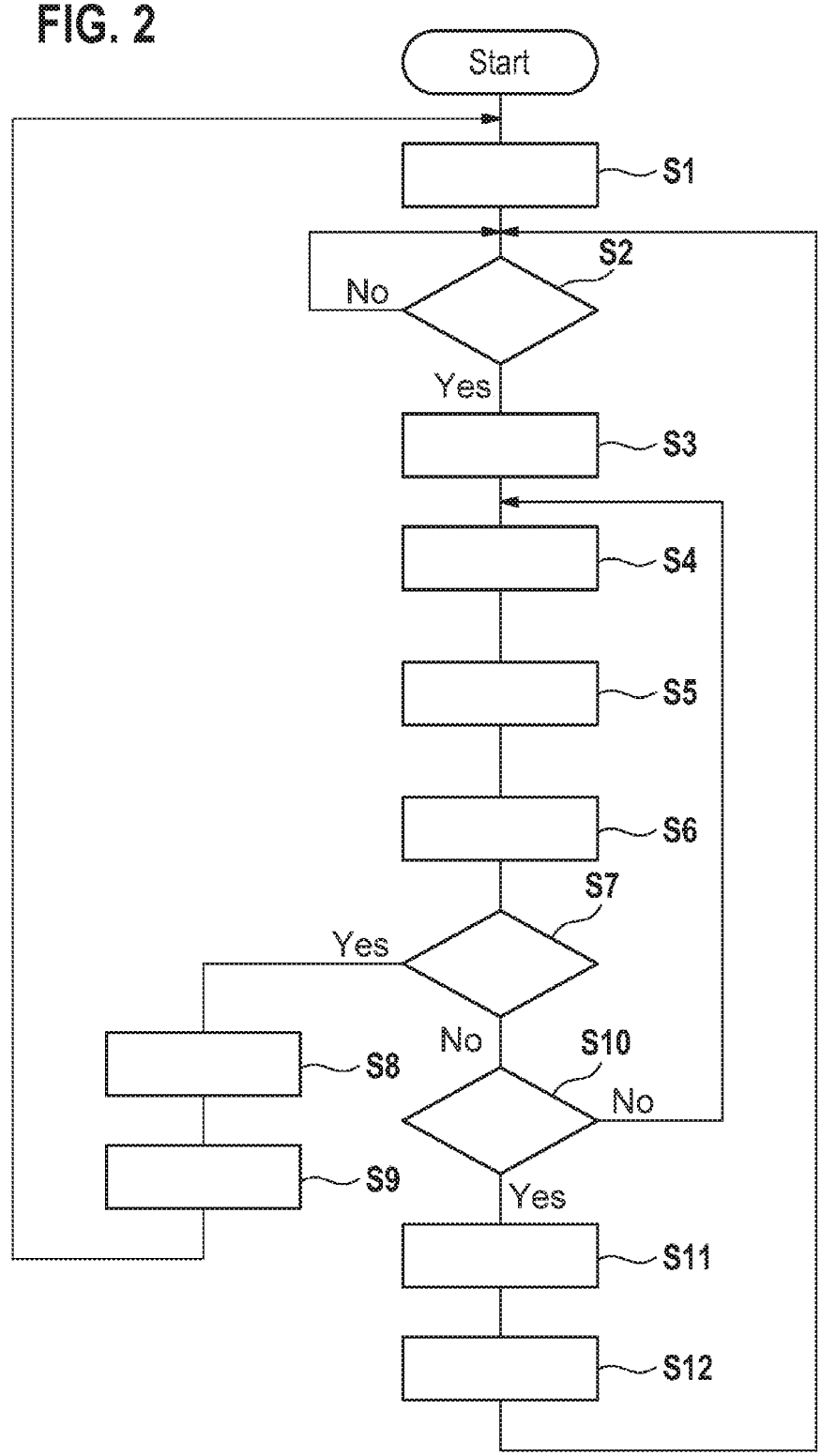
FIG. 2 shows a flow chart for representation of a procedure for operating the automatic window lifter.

In FIG. 2, a flow chart for illustrating a method for operating the automatic window lifter system 1 is represented.

In step S1, an integrator value of an integrator is reset to an initial value, in particular to 0.

In step S2, a check is carried out as to whether the operating device 8 has been operated or another signal has been received in order to move the closing element in the closing direction. If this is the case (alternative: Yes), then the method continues with step S3, otherwise it returns to step S2.

In step S3, a previously stored integrator value is read into the integrator and the electric motor 4 is started in order to move the window pane 2 in the closing direction.

In step S4, in each computing cycle an instantaneous revolution rate gradient is determined, in particular as the difference between two successive or consecutive revolution rate indicators. A revolution rate indicator can for example be determined by two items of position information of the position sensor 9 that are successively detected at a specified time interval.

In step S5, the instantaneous revolution rate gradient is subjected to (added to) a specified correction value and then integrated in step S6, i.e. summed up to an integrator value. The integrator value is an indication of a pinching force in excess of the friction of the window pane 2 in the frame. The specified correction value is selected so that fluctuations in the friction of the window pane 2 in the guides of the frame are taken into account. The specified correction value has a specified magnitude and a sign that is opposite to the sign of the instantaneous integrator value, so that when the window pane 2 is not moving, the integrator value is automatically reset to 0 or to values around 0 after a period of time specified by the correction value.

In step S7, a check is carried out as to whether a specified pinching force threshold value has been exceeded by the integrator value. If this is the case (alternative: Yes), then the electric motor 4 is stopped in step S8 regardless of the operation of the operating element 8, and in step S9 a reversal of the movement of the electric motor 4 is activated in the opening direction for a specified period of time or for a specified number of revolutions in order to open the window pane 2. The pinching force threshold value can be fixedly specified or determined as a function of a revolution rate and a motor voltage on the electric motor 4 or a motor current and the motor voltage and possibly a motor temperature, for example using a specified characteristic field.

Then the method returns to step S1 and the integrator value is reset there, because the reversal has brought about a situation in which no body part or object is now being pinched.

If exceeding the specified pinching threshold value is not detected in step S7 (alternative: No), then in step S10 a check is carried out as to whether the electric motor 4 for the window lifter should be deactivated, for example by removing the operation of the operating device 8 by an automatic switch-off, such as for example because of a time limited overvoltage shutdown of the vehicle system, for example because of energy recovery of a hybrid vehicle or similar. If a switch-off is signaled (alternative: Yes), then in step S11 the integrator value is temporarily stored and the electric motor 4 is deactivated in step S12. Then the method returns to step S2.

If no switch-off of the electric drive of the window lifter system is detected in step S10 (alternative: No), then the method jumps to step S4 and a next cycle of the calculation is started.

In an alternative embodiment, in step S3 a check can additionally be carried out as to whether the temporarily stored integrator value has exceeded a specified first intermediate pinching force threshold value, such as for example 50% of the specified pinching threshold value. If this is the case, restarting the electric motor 4 is no longer permitted and the method continues with step S2, and thus only starting the electric motor 4 in the opening direction is now permitted.

Furthermore, in step S3 a check can additionally or alternatively be carried out as to whether the temporarily stored integrator value is greater than a second intermediate pinching force threshold value, such as for example 70 to 90% of the pinching threshold value. If this is the case, then the method is continued with step S9 and a reversal of the electric motor 4 is carried out in the opening direction.

FIG. 3 shows a diagram to represent the time profiles of activation A of the electric motor 4 and the profile of the determined pinching force F. Furthermore, the pinching force threshold value is represented as 100% $F_G$, a first intermediate pinching force threshold value as 50% $F_G$ and a second intermediate pinching force threshold value as 90% $F_G$.

In FIG. 3, a case is shown in which, when switching off the electric motor 4 (point in time T1), the integrator value as an indication of the instantaneous pinching force is less than the first intermediate pinching force threshold value 50% $F_G$ (case F1). After switching the electric motor 4 back on (in the closing direction S) at the point in time T2, the integration of the revolution rate gradient is continued from the temporarily stored integrator value. In the case F1, it is detected that the integrator value is temporarily stored, that even with the electric motor 4 switched off information about the achieved pinching force remains stored, and with further operation of the electric motor 4 in the closing direction a further integration is carried out, so that even if the electric motor 4 is switched off in the meantime, the information about the pinching force is retained.

If, after the electric motor 4 is stopped again at the point in time T3, the integrator value is greater than the first intermediate pinching force threshold value 50% $F_G$ and less than the second pinching force threshold value (case F2), then no further operation of the electric motor 4 in the closing direction S is permitted and only an opening movement O of the window pane 2 is enabled. In this case, the integrator value is fully reset.

The case F2 concerns a case in which switching off the electric motor 4 is carried out if the integrator value lies in a range above the first intermediate pinching force threshold value and below the second intermediate pinching force threshold value, so that a movement of the window pane 2 in the closing direction is inhibited even when operating the operating device 8 or otherwise signaling further operation of the electric motor 4. This is detected from the fact that the integrator value does not continue to rise, even if the motor switch-on signal signals a switch-on of the electric motor 4. At the point in time T4, the operating device 8 is now operated in the direction of an opening direction, so that the integrator value is reset, and any pinched object or body part is released.

If, following a further activation of the electric motor 4 in the closing direction S at the point in time T5, the integrator value is greater than the second intermediate pinching force threshold value 90% $F_G$ and the electric motor 4 is stopped at the point in time T6 (case F3) before reaching the pinching threshold value 100% $F_G$, the electric motor 4 is reversed on further activation of the electric motor 4 at the point in time T7 and the integrator value is reset.

The invention claimed is:

1. A method for operating a closing device (1), wherein a closing element (2) can be moved against a stop edge in a closing direction using an electric motor (4) controlled by a control unit (7), with the following steps:
   - determining a pinching force on an object or a body part between the closing element and the stop edge by integrating a measurement variable, wherein the pinching force is represented by a corresponding integrator value;
   - signaling reaching a maximum permissible pinching force depending on the integrator value;
   - temporarily storing the integrator value after stopping the electric motor (4); and
   - on demanding a resumption of an operation of the electric motor (4) in the closing direction, starting the integration of the measurement variable beginning with the temporarily stored integrator value as the starting value.

2. The method as claimed in claim 1, wherein after demanding a resumption of an operation of the electric motor (4), starting the electric motor (4) in the closing direction is prevented depending on the integrator value, if the integrator value exceeds a first intermediate pinching force threshold value.

3. The method as claimed in claim 2, wherein after demanding the resumption of an operation of the electric motor (4), starting the electric motor (4) in the opening direction is permitted depending on the integrator value if the integrator value exceeds the first intermediate pinching force threshold value.

4. The method as claimed in claim 1, wherein after demanding a resumption of an operation of the electric motor (4) in the closing direction, starting the electric motor (4) in the closing direction is prevented depending on the integrator value and reversing the electric motor (4) in an opening direction opposite to the closing direction is carried out, if the integrator value exceeds a specified second intermediate pinching force threshold value.

5. The method as claimed in claim 1, wherein the measurement variable is specified as a function of a revolution rate gradient of a revolution rate of the electric motor.

6. The method as claimed in claim 1, wherein reaching the maximum permissible pinching force is signaled if the integrator value exceeds a specified pinching force threshold value in magnitude.

7. The method as claimed in claim 1, wherein when integrating the measurement variable a correction variable dependent on the integrator value is added before the integration, wherein the correction variable has a specified magnitude and an inverse sign compared to the instantaneous integrator value.

8. The method as claimed in claim 1, wherein there is a resumption of the operation of the electric motor (4) if the electric motor (4) has previously been switched off because of an overvoltage shutdown of the vehicle system.

9. A non-transitory computer readable medium comprising program code to perform each step of the method as claimed in claim 1.

10. The method as claimed in claim 1, wherein after demanding a resumption of an operation of the electric motor (4), starting the electric motor (4) in the closing direction is prevented depending on the integrator value, if the integrator value exceeds a first intermediate pinching force threshold value.

11. The method as claimed in claim 1, wherein after demanding a resumption of an operation of the electric motor (4) in the closing direction, starting the electric motor (4) in the closing direction is prevented depending on the integrator value and reversing the electric motor (4) in an opening direction opposite to the closing direction is carried out, if the integrator value exceeds a specified second intermediate pinching force threshold value.

12. The method as claimed in claim 1, wherein when integrating the measurement variable a correction variable dependent on the integrator value is added before the integration, wherein the correction variable has a specified magnitude and an inverse sign compared to the instantaneous integrator value.

13. A closing device (1) comprising:
   - a closing element (2) configured to be moved against a stop edge in a closing direction using an electric motor (4), and
   - a control unit (7) for operating the electric motor (4);
   wherein the control unit (7) is configured:
   - to determine a pinching force on an object or a body part between the closing element (2) and the stop edge by integrating a measurement variable, wherein the pinching force is represented by a corresponding integrator value;
   - to signal reaching a maximum permissible pinching force depending on the integrator value;
   - to temporarily store the integrator value after stopping the electric motor (4); and
   - on demanding a resumption of an operation of the electric motor (4) in the closing direction, to start the integration of the measurement variable beginning with the temporarily stored integrator value as the starting value.

14. A closing device (1) as claimed in claim 13, wherein the closing device is an automatic window lifter system.

* * * * *